Feb. 18, 1941. P. W. KLIPSCH 2,232,612
RECORDING SEISMIC WAVES
Filed May 1, 1937
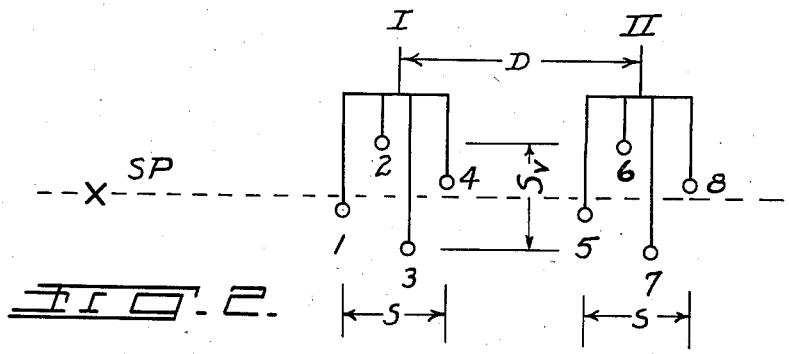
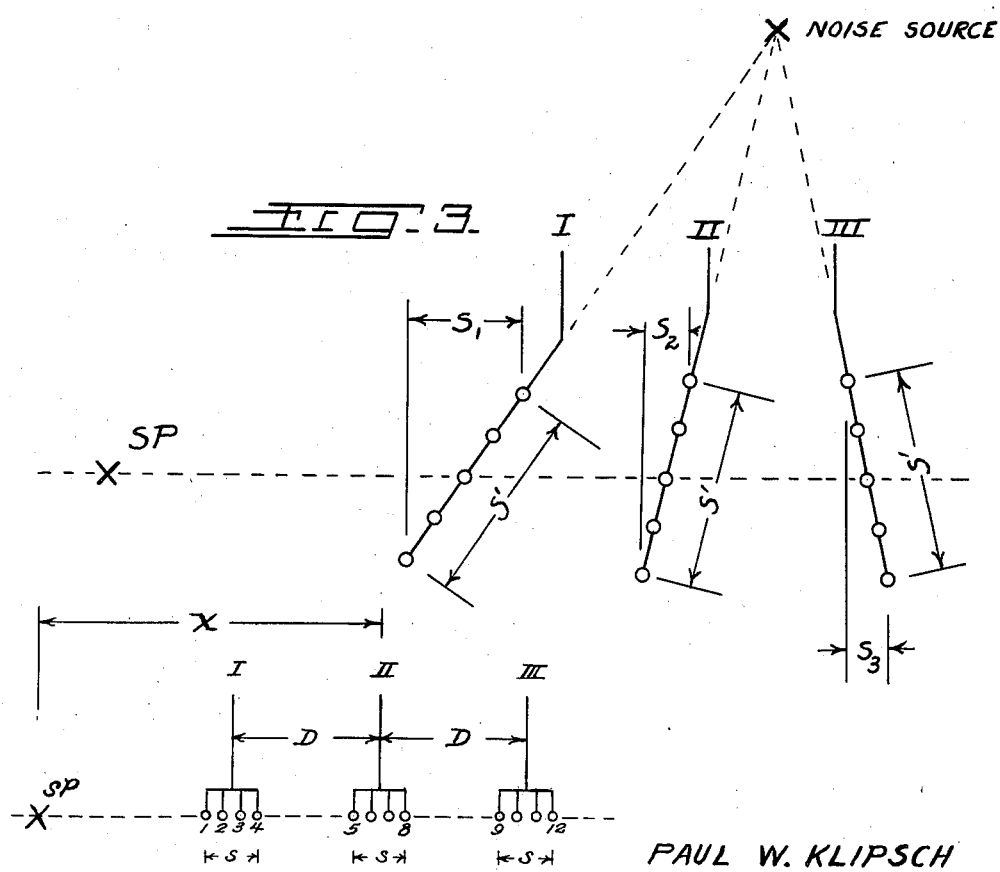
PAUL W. KLIPSCH
INVENTOR.
BY Jesse R. Stone
Lester B. Clark
ATTORNEYS.

Patented Feb. 18, 1941

2,232,612

UNITED STATES PATENT OFFICE 2,232,612

RECORDING SEISMIC WAVES

Paul W. Klipsch, Houston, Tex., assignor of fifty per cent to E. E. Rosaire, Houston, Tex.

Application May 1, 1937, Serial No. 140,090

8 Claims. (Cl. 181—0.5)

This invention relates to geophysical exploration by seismography.

An object of the invention is to increase the ratio of signal to noise, where, by way of definition, signal means that part of a recorded disturbance which can be interpreted in terms of geological structure, and noise means other parts of the recording which cannot be so interpreted. Ordinarily, the signal is a reflected wave and the noise is a summation of waves arriving by means other than reflection, arising either from the generated seismic disturbance or extraneous sources.

A more specific object is to reduce the relative amount of wind noise, seismic unrest, and other noises of a random nature with respect to the signal.

Another specific object of the invention is the reduction of noises arising from the seismic disturbance, which, while regular as to cause, frequently exhibit such irregular effects that they are amenable to reduction along with irregular noise.

A further and specific object of the invention is to minimize the effect of noise in seismic prospecting by so orienting the points of detection and translation of vibrations into recordable impulses that in superposition of the vibrations the noise vibrations are superposed at random or in destructive interference and the signal vibrations are superposed in substantially synchronous phase relation.

Other objects will become apparent from the description taken in connection with the drawing in which:

Fig. 1 shows a plan view of a group of arrays, and

Figs. 2 and 3 show plan views of alternative groups of arrays.

By way of further definition, geophone is intended to mean the transducer which converts the vibrations into recordable energy, symbolically illustrated by the reference characters 1 to 12 in the figures. Array (see Fig. 1) means the placement of geophones pertaining to one recording channel, geophones 1 to 4 constituting one array as part of channel I, geophones 5 to 8 constituting an array as part of channel II, while array III includes the geophones 9, 10, 11 and 12. The array length, S, is the difference in distance between the farthest to the nearest geophone in an array with respect to the center of disturbance. The disturbance found to be most practical is the detonation of a charge of explosive. This is frequently referred to as a shot, and its location is called a shot point, designated SP in the figures. A channel is the interconnected geophone or array of geophones and its recorder from which a single record is produced. Usually several channels are employed and the impulses produced in each are recorded side by side.

The channel spacing is the distance D between channels I and II, II and III, etc.

The spacing from channels to shot, commonly called the spread, is a measure of the distance from one or more channels to the shot, and for the present purpose will be defined as the distance from the shot to the middle of the group or channel, distance X in Fig. 1.

As practiced heretofore, attempts at improvement of signal-to-noise ratio have been based on the assumption that the noise produced by seismic disturbance was periodic and possessed certain frequencies which predominated, and that these could be eliminated by using more than one geophone per recording channel spaced so as to produce destructive interference.

Actually however, it has been found that the seismic disturbance is not periodic but impulsive, and the recorded energy consists of a large number of transients which have traveled at different velocities over different paths and finally have been superimposed at the various detectors. The spreading out of several detectors of a given recording channel over a considerable space would integrate the noise component of these separately received impulses so that the resultant would be less than such resultant would have been had the detectors been superposed at the same location. At the same time however the signal component called the signal, or wanted vibration, would consist of impulses arriving at the different detectors at different times so that the instantaneous summation of the impulses would be less than the scalar sum of these amplitudes. Thus the signal has not been improved over the noise by the expected ratio.

Furthermore, the signal transients exhibiting steep wave fronts would be obliterated from the recording. The elimination of the steep wave fronts sometimes improves the appearance of a seismogram to the layman, and even the expert is occasionally deceived by the apparent quality of a record. But this same elimination suppresses those slight irregularities known as phase breaks by which a particular portion of an event is best identified for correlation purpose from one depth measurement to the next.

Suppose, for example, that a wave front W in Fig. 1 is traveling toward the earth's surface at an appreciable angle from the vertical. It will arrive first at geophone 1, at a little later at geophone 2 and still later at geophone 3, etc. Now, for purposes of illustration, it will be assumed that spacing between first and last geophones in a given channel, or the array length, S (Fig. 1), is comparable to the channel spacing. The channels are spaced so as to produce phase shifts or time lags by which depth and dip computations can be made. For accurate computation these time lags between channels must be appreciable. If that much time lag occurs between geophones in a given channel, the asynchronous addition reduces the signal amplitude, and especially the high frequency components of the signal. The steepness of wave fronts is reduced, and minute detail present in an ordinary recording is lost, so that different portions of a vibrational event cannot be identified and correlated at different locations.

Developments resulting from recent researches show that the art as previously practiced is relatively ineffective in producing the desired result of increase in signal-to-noise ratio. A thorough analysis has led to a fuller realization of the problems involved. It is in the light of these research developments that the present invention concerns the advantages of an increase in signal-to-noise ratio by the use of more than one geophone per recording channel, which effects a reduction or even elimination of disadvantages previously existing.

The accomplishment of this invention depends on proportions and dimensions of arrays, of which Figs. 1, 2 and 3 are examples. In all these figures, the array length, S, is made small compared to the channel spacing, D, and the dimension S is made to conform to certain recently discovered principles. In order to develop the limits of this dimension, it will be necessary to review briefly the results of the above mentioned research and derive formulae for the application of those results.

It has been found that if $n$ geophones are used in a single recording channel and that if the spacing is such that the signal adds up substantially in phase and the noise adds up at random, the average gain, $$\bar{G}$$

in signal-to-noise ratio is $$\bar{G}=\frac{2}{\sqrt{\pi}}\cdot\sqrt{n} \quad\quad\quad (1)$$

(see "Some Aspects of Multiple Recording in Seismic Prospecting" by Paul W. Klipsch, Geophysics, vol. 1, No. 3, October 1936). The assumption that the signal adds up substantially in phase is important in the development of Equation 1. If the signal crest does not occur very nearly simultaneously at the various geophones, Equation 1 must be supplemented with a constant K which is less than unity, to account for the asynchronism. If the signal adds up materially out of phase in the various geophones, the gain, $$\bar{G}$$

may prove to be less than unity, which is to say a loss.

It therefore becomes necessary to determine what maximum array length can be tolerated without materially reducing signal amplitude, and what minimum array length is necessary to result in a material reduction in relative noise level.

Fortunately this is a simple problem. It will ordinarily be necessary to vary the array dimensions with the locality wherein the work is being done, the velocity of the vibrational waves being the determining factor. A typical Gulf Coast case will serve as an example.

In the Gulf Coast the average velocity and angle of emergence of reflected waves are generally such that the apparent surface velocity is at least 14,000 feet per second. This would result from an actual velocity of 7000 feet per second and an angle of emergence of 30° from the vertical; the horizontal component of velocity is then:

$$\frac{7000}{\sin 30°}=14,000 \text{ feet per second}$$

Angles as great as this probably occur but when they do the information is usually useless unless special methods of recording and analysis are employed. So 14,000 feet per second is set as minimum velocity.

Next consider the amount of detail necessary in the recording. In the Gulf Coast the steepness of wave front which may be represented by frequency components in excess of 80 cycles per second are either spurious or offer little or no value to the computer who interprets the records. The maximum tolerable time interval between crests on the first and last geophone in a given channel would be in the order of one-fourth of a cycle of this frequency or $\frac{1}{4}\times\frac{1}{80}$ or $\frac{1}{320}$ second.

The maximum tolerable array length appropriate to one channel, without impairment of signal quality, would then be $\frac{1}{320}\times 14,000=44$ feet.

The example just used may be formulated $$S_{max}=\frac{V}{\sin \phi}\cdot\frac{1}{4F} \quad\quad\quad (2)$$

Where $S_{max}$ = Maximum array length permissible, with retention of signal quality
 $V$ = Seismic velocity, minimum longitudinal for the reflected wave
 $\phi$ = Emergence angle, maximum, measured from vertical
 $F$ = Frequency maximum, a measure of the wave front steepness which must be retained This establishes the maximum array length for retention of signal quality.

It should be noted that the first term of Equation 2 gives a horizontal component of velocity, 14,000 feet in the numerical example, and the second term gives one-fourth the reciprocal of the frequency, thus Equation 2 gives a quantity equal to one-fourth the apparent or surface wave length, that is, the wave length measured along the surface of the ground of the reflected wave.

The next problem to be met is the requirement of sufficient spacing so that noise can be picked up at a sufficiently large variety of phase angles that its character becomes random.

Random noise and refracted waves travel at much lower apparent surface velocities than the signal. While waves traveling at velocities as high as 5000 feet per second possess large amplitudes, it is found that these waves have passed the recorder locations by the time the signal arrives. An experimentally acquired knowledge of the region under survey will enable the operator to arrange the geometry of channel spacing from the shot, so that the interference from the shot is limited to those components which travel at lower velocities, of the order of 1000 feet per second or less. This involves a knowledge of the relations between depths, velocities and spreads which is well established in the art of seismic prospecting.

The equipments used in the Gulf Coast are ordinarily designed to eliminate frequency components below about 20 cycles, which is to say that transients having slowly rising wave fronts are not recorded. Again using frequency as a measure of steepness for a transient wave front, it is possible to find what minimum array length is necessary for noises traveling at 1000 feet per second to add up out of phase or in a random manner. This length is of the order of one half wave length of the 20 cycle component or $\frac{1}{2} \cdot 1000/20 = 25$ feet, which may be formulated, $$S_{min} = \frac{v}{2f} \quad (3)$$

where $S_{min}$ = minimum array length permissible for suppression of noise $v$ = maximum velocity of propagation of noises or refracted waves $f$ = frequency minimum, a measure of how slowly the wave front of the unwanted transient rises Thus the minimum spacing for noise reduction is established.

If a compromise is found to be necessary, when (3) gives a greater value than (2), it is generally better to let (2) govern, since the signal can frequently be identified through the noise if the signal is not suppressed, but a signal lost by lengthening the array cannot be regained except by reshooting.

In those fortunate cases when $S_{max} > S_{min}$, the operator has considerable latitude, but preference should usually be toward the lower value, or toward making the array length less than the maximum permissible whenever possible.

Fig. 1, fulfilling the spirit of the invention, is aimed at an increase in signal-to-noise ratio where most of the noise originates at the shot. Here, the channel spacing, D, is made large enough for useful interpretation of results, and the array length S is made small relative to D so that it falls within the limitations imposed by Equations 2 and 3.

In Fig. 1, a shot point, SP, and three channels, I, II and III are illustrated in plan view in which 1 ... 12 are geophones connected in arrays corresponding to the channels. The array length, S, is illustrated as small compared to the channel spacing, D, so that appreciable time lags can occur between channels without excessive time lags occurring within a given channel.

Figs. 2 and 3 possess the advantage of being particularly effective in reducing the effects of noise arriving from some direction other than that of the shot.

In Fig. 2 only two channels, I and II are shown, though more than two would normally be utilized. The arrays have a component of length in the line of the shot of S, and transverse to this line the array width is designated $Sv$. The tilted squares of this figure are symbolic only, in that a number of geophones other than 4 may be used, and disposed in any pattern; the illustration merely depicts the dimensions of the array in which S and $Sv$ are the in-line and transverse components. The amount of array spread at right angles to the shot direction SP, should be kept below that value where the signal would begin to add up out of phase as a result of shooting along strike over a steeply dipping bed, an effect known as "side swipe" in the seismic art.

Here again, the array length, or more specifically that component of the array which is colinear with the direction from the shot, designated S, should conform to Equation 2.

Fig. 2 is adapted to the reduction of generally irregular noise, originating at a variety of sources, such as seismic unrest and wind noise. Its geometry should, if possible, conform to Equation 3 as well as Equation 2.

Fig. 3 is adapted to the reduction of steady regular noise originating at a single source other than the shot. For example, the noise from a nearby pump, drill or other machine, which would ordinarily interfere with the signal on a seismogram can be discriminated against. Here the arrays are made directive toward the noise source so that vibrations from that direction and of the frequencies of the noise and its harmonics suffer destructive interference. In each of the channels I, II, III, the array length in the direction of the noise is denoted $S'$, which is determined by the noise frequencies and velocities. The components of array length in the direction of the shot, $S_1$, $S_2$ and $S_3$ must be within the limitation imposed by Equation 2.

Obviously, other arrays may be devised which would fall within the scope of this invention which broadly comprehends such orientation of the points of translation of vibrations into recordable impulses that the superposition of vibrations from a given array causes noise vibrations to suffer destructive interference while the signal vibrations are superposed in substantially synchronous phase relation.

What is claimed is:

1. The method of exploring geological formations which comprises, creating a center of seismic disturbance in the crust of the earth, receiving the seismic waves at a group of horizontally spaced detector points, spacing such points to form an array length determined from the minimum surface velocity of reflected waves and the maximum surface velocity of noise waves until the length is less than a maximum value equal to one-fourth of the apparent surface wave length of the reflected wave and is greater than a mimimum value equal to one-half wave length of the surface noise waves, and recording the algebraic sum of the impulses received at all the points in the group.

2. The method of exploring geological formations which comprises, creating a center of seismic disturbance in the crust of the earth, receiving the seismic waves at a plurality of groups of detector points horizontally spaced to form arrays having lengths which are determined respectively from the velocity, emergence angle and frequency components of the reflected waves and the velocity and frequency components of the noise waves, spacing the points within each array until the array length is less than one-fourth of the apparent surface wave length of the reflected wave, and greater than one-half wave length of the surface noise waves and recording the algebraic sum of each of the groups of waves received at the detector points.

3. The method of exploring geological formations which comprises creating a center of seismic disturbance in the crust of the earth, receiving the seismic waves at spaced detector points, spacing the detector points to form an array whose component of length in the direction of a noise source other than the direction of the seismic center is at least a minimum value of the order of one-half wave length of the noise waves and whose one component of length in the direction of the seismic center is less than the maximum value of the order of one-fourth the apparent surface wave length of the reflected waves determined by the velocity, emergence angle and frequency of the reflected waves, and recording the algebraic sum of the noise and reflected waves received at the detector points.

4. The method of exploring geological formations which comprises, creating a seismic disturbance in the crust of the earth, receiving the seismic waves at a plurality of groups of detector points in the earth, said groups of detector points being spaced from each other and from the point of disturbance, the detector points in each group being spaced to form an array having a length from about 25 to 50 feet, and recording the resultant waves from each group.

5. The method of exploring geological formations which comprises, creating a seismic disturbance in the crust of the earth, receiving the seismic waves at detector points in the earth and spaced to form a plurality of groups each consisting of an array whose component of length in the direction of the disturbance is between approximately 25 and 50 feet and the groups are so spaced that the component of spacing in the direction of the disturbance is of the order of at least twice said component of array length, and recording the resultant waves from each group.

6. The method of exploring geological formations which comprises creating a center of disturbance in the earth's crust, receiving the seismic waves at detector points arranged in a plurality of spaced groups of several points each, said points within each group being horizontally spaced in the earth's crust to form an array length intermediate the maximum and minimum values expressed by the equations:

$$S_{max} = \frac{V}{\sin \phi} \cdot \frac{1}{4F}$$

$$S_{min} = \frac{v}{2f}$$

wherein
$S_{max}$ = maximum permissible array length
$S_{min}$ = minimum permissible array length
$V$ = minimum longitudinal seismic velocity of the reflected waves
$v$ = maximum longitudinal seismic velocity of the refracted noises to be reduced
$F$ = maximum frequency to be recorded
$f$ = frequency minimum to be recorded
$\phi$ = maximum emergence angle of reflected waves measured from the vertical, and simultaneously recording for each array the algebraic sum of the impulses received at the points within that array.

7. The method of exploring geological formations which comprises creating a center of disturbance in the earth's crust, receiving the seismic waves at detector points arranged in a plurality of spaced groups of several points each, said points within each group being horizontally spaced in the earth's crust to form an array length intermediate the maximum and minimum values expressed by the equations:

$$S_{max} = \frac{V}{\sin \phi} \cdot \frac{1}{4F}$$

$$S_{min} = \frac{v}{2f}$$

wherein
$S_{max}$ = maximum permissible array length
$S_{min}$ = minimum permissible array length
$V$ = minimum longitudinal seismic velocity of the reflected waves
$v$ = maximum longitudinal seismic velocity of the refracted noises to be reduced
$F$ = maximum frequency to be recorded
$f$ = frequency minimum to be recorded
$\phi$ = maximum emergence angle of reflected waves measured from the vertical, spacing the groups a distance of an order at least twice the array length and simultaneously recording for each array the algebraic sum of the impulses received at the points within that array.

8. The method of exploring geological formations which comprises, creating a center of seismic disturbance in the crust of the earth, receiving the seismic waves at a plurality of groups of detector points horizontally spaced to form arrays having lengths which are determined respectively from the velocity, emergence angle and frequency components of the reflected waves and the velocity and frequency components of the noise waves spacing the points within each array until the array length is less than one-fourth of the apparent surface wave length of the reflected wave and greater than one-half wave length of the surface noise waves, spacing the groups a distance to an order of at least twice the array length, and recording the algebraic sum of the waves received at each of the groups of detector points.

PAUL W. KLIPSCH.